Figure 6:
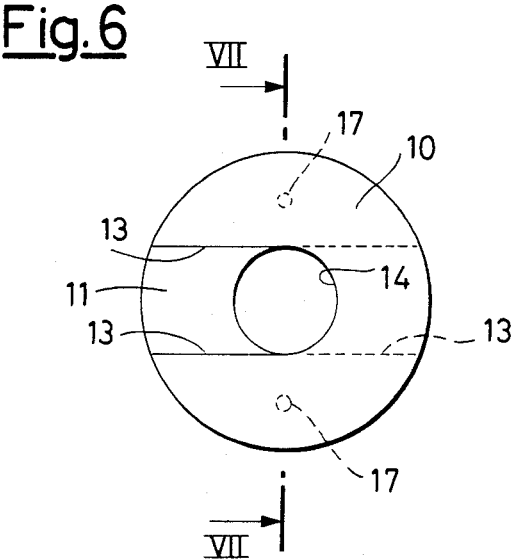

United States Patent [19]

Cresti

[11] Patent Number: 4,490,954
[45] Date of Patent: Jan. 1, 1985

[54] MASKING COVER FOR A WALL SURFACE AROUND A PIPE WHICH EMERGES THEREFROM

[76] Inventor: Alfio Cresti, Corso Brunelleschi 81, Torino, Italy

[21] Appl. No.: 392,012

[22] Filed: Jun. 25, 1982

[30] Foreign Application Priority Data

Jul. 3, 1981 [IT] Italy ............................ 53411/81[U]

[51] Int. Cl.³ ............................ E04F 19/00; F16L 5/00
[52] U.S. Cl. ........................................ 52/221; 285/46; 411/532; 137/377
[58] Field of Search ................. 52/221; 16/2; 137/377; 126/315; 285/46; 411/532

[56] References Cited

U.S. PATENT DOCUMENTS

| 650,753 | 5/1900 | Gibson | 411/532 |
|---|---|---|---|
| 885,052 | 4/1908 | Jensen | 411/532 |
| 1,023,460 | 4/1912 | Dustman | 285/46 X |
| 1,278,895 | 9/1918 | Farley | 285/46 X |
| 1,452,492 | 4/1923 | Carpenter | 411/532 |
| 2,751,250 | 6/1956 | Block | 137/377 X |
| 4,366,866 | 1/1983 | Sweeney | 285/46 X |
| 4,407,023 | 10/1983 | Norton | 285/46 X |

FOREIGN PATENT DOCUMENTS 96831 11/1922 Switzerland .......................... 285/43

Primary Examiner—J. Karl Bell
Attorney, Agent, or Firm—Young & Thompson

[57] ABSTRACT

A masking cover for a wall surface 16 around a pipe 15 which emerges therefrom, constituted by two circular concentric plates 10 and 11 each provided with a radial slot 13 having parallel edges which are connected together by a semicircular portion 14 having its center coinciding with that of the plates 10 and 11, the plates being arranged for mounting by way of their slot 13 around the pipe 15 in order to form a single stable facing in the form of a circular masking cover.

1 Claim, 9 Drawing Figures

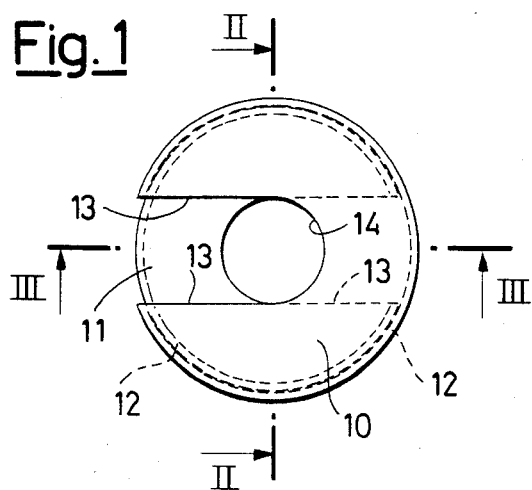
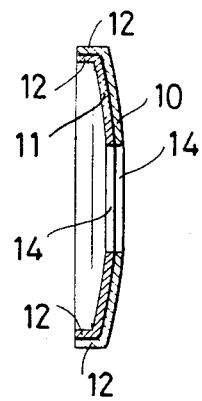
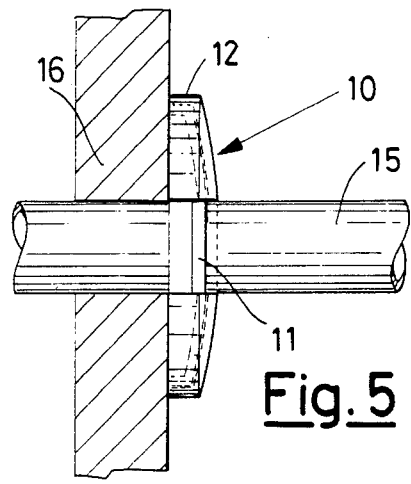
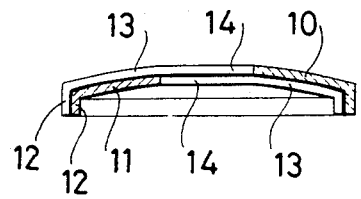
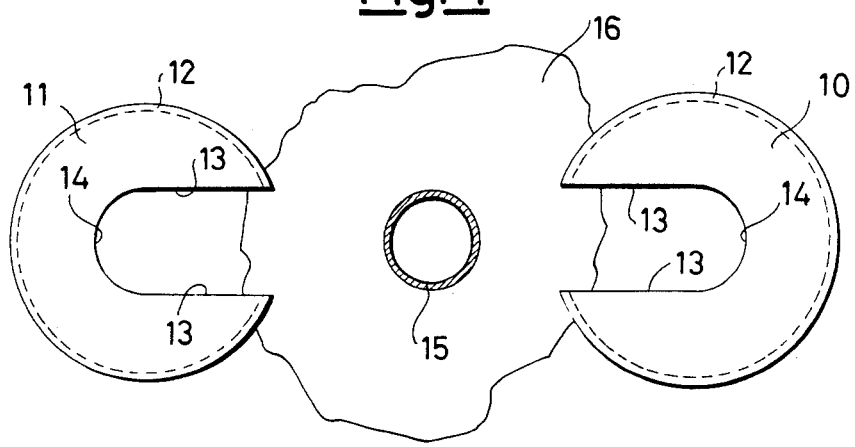

MASKING COVER FOR A WALL SURFACE AROUND A PIPE WHICH EMERGES THEREFROM

DESCRIPTION

The invention relates to a masking cover for a wall surface around a pipe which emerges therefrom.

In particular, the invention is designed for use on pipes traversed by hot fluid, such as those pertaining to hot-water radiators.

At the present time, seals are not provided around such pipes for covering the surrounding wall surface, one reason being that the cups now used for covering sanitary service pipes deform due to the frequent temperature changes to which hot-water radiators are subjected, thus escaping from their seat and becoming completely useless for the decorative purpose for which they are intended.

Consequently, the walls are usually left bare without any masking cover for covering the ugliness of any pipe projecting from them.

Moreover, because of the temperature changes which occur in such pipes through which hot water passes, it often happens that the wall plaster flakes off in the immediate vicinity of the pipe, leading to obvious drawbacks in terms of appearance.

When the pipe has been installed, it is no longer possible even to attempt to safeguard the surrounding wall with the cups available at the present time, because these have to be mounted along the pipe, and it would therefore be necessary to dismantle the system in order to mount the cup along the projecting end.

The object of the invention is to provide a masking cover which can be mounted around any pipe, including already installed pipes, without having to dismantle the system or adapt the pipe to the masking cover. In addition, the configuration of the masking cover is of good appearance, and enables a reliable seal to be made around the pipe in spite of the continuous temperature changes to which it can be subjected.

The application of the masking cover to hot-water radiator pipes is obviously only one of the many possible applications, this certainly being the most demanding. The masking cover can in fact also be used for sanitary services, wash basins and the like, in which the problem of material expansion due to frequent repeated cooling and heating of the fluid flowing through the pipe does not exist.

In such cases, the proposed masking cover can also be advantageously used either on already existing pipes or on new systems, or again for replacing the old cups of poor appearance used at the present time.

These and further objects which will be more apparent hereinafter are attained according to the invention by a masking cover for a wall surface around a pipe which emerges therefrom, characterised by comprising two circumferential concentric plates each provided with a radial slot having parallel edges which are connected together by a semicircular portion having its centre coinciding with that of the plate.

A description is given hereinafter of the proposed masking cover with reference to the accompanying drawings, in which:

FIG. 1 is a front view of the proposed masking cover

Figure 7:
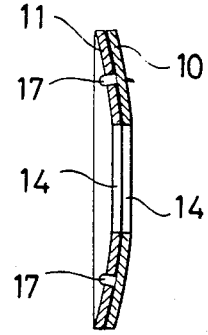
Figure 8:
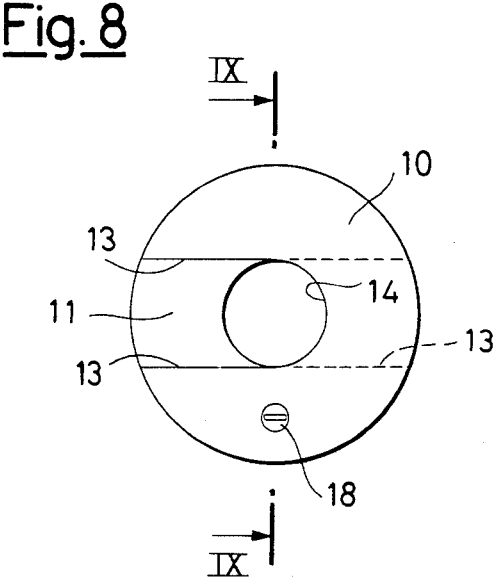
Figure 9:
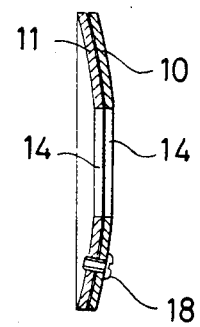

FIGS. 2 and 3 are sections on the lines II—II and III—III of FIG. 1 respectively FIG. 4 is a view of one stage during the assembly of the masking cover FIG. 5 is a section through the wall in a position corresponding with the pipe and masking cover FIGS. 6 and 8 are two further embodiments of the masking cover according to the invention, which are of equal application to that of FIG. 1 and utilise the same inventive concept FIGS. 7 and 9 are sections on the lines VII—VII and IX—IX of FIGS. 6 and 8 respectively.

From FIGS. 1, 2 and 3 it can be seen that the masking cover is formed from two slightly convex circular plates 10 and 11 with a bent perimetral rim 12.

In each plate there is provided a slot 13 having parallel edges which are connected together by a semicircular portion 14, the axis of which coincides with the centre of the plate. The surface of the plate 10 is slightly higher than the surface of the plate 11 to an extent such that the former plate can perfectly contain the latter plate in its interior by means of a slight interference fit, as shown in the figures.

FIG. 4 shows the mounting of the masking cover on to the pipe 15 in contact with the wall 16.

The plate 11 of smaller dimensions is firstly fitted by sliding it along the slot 13 until the pipe 15 abuts against the circular portion 14. The same operation is then carried out from the other side with the plate 10. This latter is pressed on to the plate 11, on which it rests by mating at all points, the plate 11 being already abutting against the wall 16.

The result is as shown in FIG. 5. Frontally, the two plates appear as in FIG. 1 in which the slots 13 are covered respectively by the underlying plate 11 and overlying plate 10, and the portions 14 remain to form a single circular bore about the pipe 15.

The rims 12 help to keep the two plates fitted together, and if the distance between the edges of the slots 13 is such that the plates are subjected to slight interference about the pipe 15, the resultant masking cover will not slide axially along the pipe and thus separate from the wall 16.

FIGS. 6, 7 and 8, 9 show two further embodiments of the masking cover by way of example, using the same inventive concept as the preceding embodiment.

In FIGS. 6 and 7 the two plates 10 and 11 do not have bent rims 12, but instead the plate 10 is provided with pins 17 designed for insertion with a slight interference fit into corresponding bores in the underlying plate 11.

Thus instead of the friction fit between the rims 12, in this case the pins 17 (of variable number) form the mutual connection between the two plates.

In the embodiment of FIGS. 8 and 9, the two plates 10 and 11 comprise threaded bores into which a screw 18 is screwed to connect together the two plates 10 and 11.

These are only some of the modifications in form and structure which can be made without leaving the scope of the invention, as defined by the following claims.

What we claim is:

1. A masking cover for a wall surface around a pipe which emerges therefrom, characterized by comprising two circular concentric plates 10 and 11 each provided with a radial slot 13 having parallel edges which are connected together by a semicircular portion 14 having its center coinciding with that of the plates 10 and 11 and its diameter equal to the width of the slot, each plate 9 and 10 having a bent-over substantially continuous circular peripheral rim 12 of which one fits within the other with a slight interference fit when the two plates are fitted together thereby to restrain said plates 9 and 10 against movement in any direction relative to each other.

* * * * *